United States Patent

Kitazawa et al.

[11] Patent Number: 5,911,814
[45] Date of Patent: Jun. 15, 1999

[54] BAKED COLOR PENCIL LEAD AND PROCESS FOR PRODUCING THE SAME

[75] Inventors: Katsunori Kitazawa, Takasaki; Masaaki Hoshiba, Fujioka, both of Japan

[73] Assignee: Mitsubishi Pencil Kabushiki Kaisha, Tokyo, Japan

[21] Appl. No.: 09/102,333

[22] Filed: Jun. 22, 1998

[30] Foreign Application Priority Data

Jul. 14, 1997 [JP] Japan .................................. 9-188299

[51] Int. Cl.⁶ .................................................. C09D 13/00
[52] U.S. Cl. .......................................................... 106/31.11
[58] Field of Search ........................................... 106/31.11

[56] References Cited

U.S. PATENT DOCUMENTS

| | | | |
|---|---|---|---|
| 4,688,572 | 8/1987 | Iizuka et al. | 106/31.11 |
| 5,346,540 | 9/1994 | Schlennert | 106/31.11 |
| 5,595,589 | 1/1997 | Hoshiba et al. | 106/31.11 |
| 5,716,434 | 2/1998 | Koyama | 106/31.11 |

FOREIGN PATENT DOCUMENTS

| | | | |
|---|---|---|---|
| 2635690 | 5/1977 | Germany | 106/31.11 |
| 58-5951 | 2/1983 | Japan . | |
| 59-218896 | 12/1984 | Japan . | |
| 60-118772 | 6/1985 | Japan | 106/31.11 |
| 64-2155 | 1/1989 | Japan . | |
| 03-153779 | 7/1991 | Japan | 106/31.11 |
| 4-23671 | 4/1992 | Japan . | |
| 7-41723 | 2/1995 | Japan . | |

*Primary Examiner*—Helene Klemanski
*Attorney, Agent, or Firm*—Darby & Darby

[57] ABSTRACT

A baked color pencil lead prepared by impregnating pores of a white or light-colored porous baked lead with a dye solution prepared by dissolving a dye in a mixed solvent of polyoxyethylene alkyl ether represented by the following Formula (1) and a low boiling point organic solvent, wherein polyoxyethylene alkyl ether contained in the dye solution is adjusted to 35 to 90% by weight, and then drying to remove the low boiling point organic solvent:

$$R_1\text{—}O\text{—}(CH_2CH_2O)_n H \qquad (1)$$

wherein $R_1$ represents a decyl, undecyl, lauryl, tridecyl or oleyl group, and n is an integer of 1 to 14, and a process for producing the same.

4 Claims, No Drawings

BAKED COLOR PENCIL LEAD AND PROCESS FOR PRODUCING THE SAME

BACKGROUND OF THE INVENTION

1. Field of the Invention

The present invention relates to a baked color pencil lead which is excellent in mechanical strength such as flexural strength while having a vivid coloring property and sufficient intensity of the drawn lines and which can readily be erased with an eraser, and which is suited particularly to a color pencil lead for a mechanical pencil, and to a process for producing the same.

2. Description of the Related Art

Conventional baked color pencil leads have been produced by kneading and extrusion-molding a blending composition comprising a filler such as boron nitride and a binder such as clay and subjecting a molded article to heat treatment to prepare a porous lead and filling pores of this lead with an ink comprising a dye and the like.

In this case, important characteristics required for leads are high mechanical strength, a vivid coloring property, high intensity of drawn lines, good aging stability and easy erasability with an eraser.

In this regard, an ink to be filled has to be non-volatile in terms of intensity of drawn lines and aging stability.

If a volatile ink is used, a remaining dye is solidified, so that the lead is felt hard and scratching when used to write and the intensity of the drawn lines becomes low. When only the solidified dye finally remains, the dye has difficulty in coloring, so that even a hue of the lead changes.

On the other hand, in the case that a non-volatile ink is filled, a dye dissolved in a high boiling point organic compound having a low vapor pressure is filled into pores of a lead. However, inks having satisfactory characteristics in terms of solubility of a dye, writing performance and erasability with an eraser have not yet been obtained.

In order to solve these problems, solvents for non-volatile inks to color leads are disclosed in Japanese Patent Publication No. Sho 58-5951, Japanese Patent Publication No. Hei 4-23671 and Japanese Patent Application Laid-Open No. Hei 7-41723.

However, many of these solvents are solid or viscous liquid at room temperature, so that the erasability with an eraser is not satisfactory. Further, in order to assure strength of a lead, a size of the pores should not be increased so much, and it is difficult to fill an ink using a solid or a viscous liquid as a solvent into a lead having fine pores. As a result, produced is the problem that a difference occurs between concentrations and hues at the head and the core of the lead. Further, the solvents which are liquid at room temperature are included in the publications described above, but they are not satisfactory in terms of solubility of a dye and color intensity of the drawn lines.

In particular, it is described in Japanese Patent Publication No. Sho 58-5951 that polyalkylene glycol alkyl ether is used for the purpose of facilitating to allow a dye ink to be impregnated. However, a specific kind and a using amount thereof are not specified, and the ether is not used as a principal component but used as an additive.

Further, disclosed in Japanese Patent Publication No. Sho 64-2155 is a baked type pencil lead filled into pores with a polyoxyethylene alkyl ether base nonionic surfactant together with a mineral oil for the purpose of providing an antistatic effect. However, the baked type pencil lead produced by this process is a so-called black pencil lead comprising a binder comprising clay and various organic substances and a colorant such as graphite as principal components. It is different from a color pencil lead prepared by filling a dye ink into a white or light-colored porous baked lead comprising a colorless or white filler and a binder.

Further, disclosed in Japanese Patent Application Laid-Open No. Sho 59-218896 is a process for producing a color lead by impregnating pores of the lead with a high penetrable ink containing lower alcohol such as ethanol, benzyl alcohol or toluene as a medium and then drying to remove the medium described above, followed by impregnating the lead with a non-volatile ink containing a fatty acid such as oleic acid or a fatty acid ester as a medium. However, this production process comprises the steps of impregnating the pores with a high penetrable ink, then drying to remove the medium such as benzyl alcohol and impregnating the lead with a non-volatile ink. That is, two or more impregnation steps such as impregnation step→drying step→impregnation step - - - are required, and therefore there is a problem that the production steps are complicated and color shade is caused by impregnation of the ink carried out twice.

SUMMARY OF THE INVENTION

An object of the present invention is to solve the preceding problems of conventional techniques and to provide a baked color pencil lead which is excellent in mechanical strength such as flexural strength while having a vivid coloring property and sufficient intensity of the drawn lines and which can readily be erased with an eraser, and a process for producing the same.

Intensive researches continued by the present inventors have resulted in finding that the problems described above can be solved by filling pores of a white or light-colored porous baked lead with a dye ink containing a specific amount of specific polyoxyethylene alkyl ether, and thus coming to complete the present invention.

That is, the baked color pencil lead of the present invention is prepared by impregnating pores of a white or light-colored porous baked lead with a dye ink containing 37% by weight or more of polyoxyethylene alkyl ether represented by the following Formula (1):

$$R_1\text{—O—}(CH_2CH_2O)_nH \tag{1}$$

wherein $R_1$ represents a decyl, undecyl, lauryl, tridecyl or oleyl group, and n is an integer of 1 to 14.

In particular, preferred is the lead obtained by filling the dye solution described above into pores of a white or light-colored porous baked lead comprising a colorless or white filler and silicon nitride that is a binder using perhydropolysilazane as a starting material.

A process for producing a baked color pencil lead according to the present invention comprises the steps of:

forming a white or light-colored porous baked lead, filling the pores of the above baked lead with a dye solution prepared by dissolving a dye in at least polyoxyethylene alkyl ether represented by the following Formula (1) and a low boiling point organic solvent such as lower alcohol, and drying to remove the above low boiling point organic solvent:

$$R_1\text{—O—}(CH_2CH_2O)_nH \tag{1}$$

wherein $R_1$ represents a decyl, undecyl, lauryl, tridecyl or oleyl group, and n is an integer of 1 to 14.

The color pencil lead of the present invention is prepared by filling the pores with the dye dissolved in polyoxyethylene alkyl ether and the low boiling point organic solvent and then removing the low boiling point organic solvent by evaporation. Thereafter polyoxyethylene alkyl ether remains in the lead, so that the lead is excellent in mechanical strength such as flexural strength while keeping a vivid coloring property and sufficient intensity of the drawn lines and can easily be erased with an eraser. In particular, the lead does not swell an NBR-made holding chuck in a mechanical pencil with a bleeding ink on the surface of the lead.

DETAILED DESCRIPTION OF THE PREFERRED EMBODIMENTS

The present invention shall be explained below in detail.

The baked color pencil lead of the present invention contains a dye ink containing 37% by weight or more of polyoxyethylene alkyl ether represented by the following Formula (1) in the pores of a white or light-colored porous baked lead.

The baked color pencil lead of the present invention is produced by forming a white or light-colored porous baked lead, filling the pores of the above baked lead with a dye solution prepared by dissolving a dye in a mixed solvent of at least polyoxyethylene alkyl ether represented by the following Formula (1) and a low boiling point organic solvent such as lower alcohol, and then drying to remove the said low boiling point organic solvent, wherein polyoxyethylene alkyl ether contained in the dye solution has a content of 35 to 90% by weight:

$$R_1\!-\!O\!-\!(CH_2CH_2O)_n H \qquad (1)$$

wherein $R_1$ represents a decyl, undecyl, lauryl, tridecyl or oleyl group, and n is an integer of 1 to 14.

In the present invention, the porous baked lead comprises at least a colorless or white filler such as boron nitride, talc, mica, silica and alumina, which has so far been known publicly, and silicon nitride or clay that is a binder.

In particular, suitable in terms of strengh is the lead comprising silicon nitride as a binder using perhydropolysilazane as a starting material as disclosed in Japanese Patent Application Laid-Open No. Hei 8-48931.

The filler shall not specifically be restricted as long as it has so far been used as a filler for a baked color pencil lead and is colorless or white, and any of the fillers described above can be used. Further, a mixture of several kinds thereof can be used as well.

If $R_1$ of polyoxyethylene alkyl ether has less carbon atoms than that of a decyl group, the writing performance given by the lubricity and the aging stability given by the volatility are not satisfactory.

On the other hand, if the carbon atoms thereof are larger than that of a tridecyl or oleyl group, the solubility of the dye is reduced. And polyoxyethylene alkyl ether is solid at room temperature depending on the number of n, so that problems are brought about on the erasability with an eraser and the writing performance resulting from an abrasion amount of the lead. Further, which is larger than the number described above causes problems that the erasability with an eraser is reduced since polyoxyethylene alkyl ether is solid at room temperature and an NBR-made holding chuck in the mechanical pencil is liable to be damaged.

The blending amount of polyoxyethylene alkyl ether can not generally be fixed since the kind and the blending amount of the dye and the blending amount of the low boiling point organic solvent are varied depending on the color, and it falls preferably in a range of 35 to 90% by weight based on the dye solution in terms of expected effects thereof.

When the blending amount falls in the range described above, the dye ink obtained after removing the low boiling point solvent has a polyoxyethylene alkyl ether content of 37% by weight or more (the upper limit thereof varys depending on the blending amount of the dye and therefore can not be specified).

Any of alcohols, ketones, esters, ethers, aliphatic hydrocarbons and aromatic hydrocarbons can be used as the low boiling point organic solvent as long as they are available in the market and compatible with polyoxyethylene alkyl ether represented by Formula (1) described above. They are finally dried and removed, and therefore the solvents having a boiling point of 150° C. or lower are preferred considering a heat resistance of the dye and an energy cost for drying. Ethyl alcohol and isopropyl alcohol are particularly preferred in terms of safety. These solvents can be used as well in a mixture. If the blending amount of the low boiling point solvent is less than 5% by weight, an effect of improving the solubility of the dye is not expected much. On the other hand, if it exceeds 40% by weight, the dye is liable to be solidified by drying to remove the solvent, and the lead being felt hard when used to write is liable to be obtained. The preferred blending amount is 10 to 30% by weight.

Any of spirit-soluble dyes, oil soluble dyes and basic dyes can be used as the dye as long as they can be dissolved in polyoxyethylene alkyl ether represented by Formula (1) described above and the low boiling point solvents. These dyes can be used as well in a mixture of plural kinds thereof.

A method of filling the porous baked lead with the dye solution includes a method in which the porous baked lead is dipped into the dye solution to fill the pores thereof with the solution, if necessary, under conditions of heating, applying pressure or reducing pressure, and then the low boiling point organic solvent is removed by drying. In order to further increase the concentration, dipping and drying may be repeated.

Further, UV absorbers, light stabilizers and anti-static agents may be added to the dye solution if necessary, or the lead obtained after filled with the dye may further be impregnated with polyoxyethylene alkyl ether represented by Formula (1) described above and oil for the purpose of improving the writing performance.

In the baked color pencil lead of the present invention thus constituted and the production process for the same, the following actions (1) to (3) are provided.

(1) Impregnated and filled is the dye dissolved concentratedly in a mixed solvent obtained by adding a low boiling point organic solvent such as lower alcohol in order to improve the solubility in addition to polyoxyethylene alkyl ether as the solvents for the dye. Accordingly, the dye enough for obtaining high intensity of the drawn lines can be filled evenly into small pores having a diameter of about 0.1 $\mu$m. Further, the pores may have a small diameter, and therefore strength of the lead is high.

(2) Since the low boiling point organic solvent such as lower alcohol out of the solvents filled into the pores of the lead is completely dried and removed, the dye ink comprising at least the dye and polyoxyethylene alkyl ether becomes stable in the passage of time and scarcely volatile. Accordingly, obtained is the baked pencil lead having a vivid coloring property, sufficient intensity of the drawn lines and excellent aging stability.

(3) The dye ink contained in the baked pencil lead of the present invention is a liquid having a low viscosity at room temperature and has an effect of promoting an abrasion of the porous baked lead to improve the writing performance. Further, the dye ink is hard to stick on a paper surface and therefore can readily be erased with an eraser.

EXAMPLES

Next, the present invention shall more specifically be explained with reference to examples, but the present invention shall by no means be restricted by these examples.

Example 1

| Boron nitride | 40% by weight |
|---|---|
| Vinyl chloride resin | 43% by weight |
| Dioctyl phthalate (DOP) | 16% by weight |
| Oleic amide | 1% by weight |

The blended composition described above was dispersed by mixing by means of a Henschel mixer and kneaded by means of a pressure kneader and two rolls. Then, it was molded into a fine line by extrusion, and the molded fine line was subjected to heat treatment at 180° C. for 10 hours in the air to remove the remaining plasticizer (DOP). Thereafter, the temperature was elevated up to 1000° C., and the fine line was baked at 1000° C. for one hour in a nitrogen atmosphere to obtain a first baked lead.

This first baked lead was heated and baked at 700° C. in an oxidative atmosphere to remove carbonized resin compounds, whereby a white second baked lead was obtained.

This second baked lead was dipped into a perhydrosilazane-containing solution at room temperature for one day and then heated up to 700° C. and baked at 700° C. for one hour in a nitrogen atmosphere, whereby a white third baked lead having a diameter of 0.57 mm was obtained.

Next, the third baked lead described above was dipped into a red dye solution comprising:

| red dye [Spilon Red C-GH (manufactured by Hodogaya Chemical Co., Ltd.) | 25% by weight |
|---|---|
| ethyl alcohol | 15% by weight |
| polyoxyethylene oleyl ether (n = 2) | 60% by weight | and left standing at room temperature for 24 hours. The lead was taken out from the solution and then dried at 80° C. for 5 hours to remove ethyl alcohol, whereby a red baked pencil lead having a diameter of 0.57 mm was obtained.

Example 2

The same baked lead (third baked lead) as in Example 1 was dipped into a blue dye solution comprising:

| blue dye [Valifast Blue 1605 (manufactured by Orient Chemical Ind. Co., Ltd.) | 15% by weight |
|---|---|
| isopropyl alcohol | 20% by weight |
| polyoxyethylene lauryl ether (n = 4.5) | 65% by weight | and left standing at room temperature for 24 hours. The lead was taken out from the solution and then dried at 90° C. for 5 hours to remove isopropyl alcohol, whereby a blue baked pencil lead having a diameter of 0.57 mm was obtained.

Example 3

| Boron nitride | 40% by weight |
|---|---|
| Kaolin | 35% by weight |
| Polyvinyl alcohol | 18% by weight |
| Polyethylene glycol | 7% by weight |

The blended composition described above and water having the same weight as that of the blended composition were dispersed by mixing by means of the Henschel mixer and kneaded by means of two rolls to adjust the moisture content. Then, it was molded into a fine line by extrusion, and the molded fine line was subjected to heat treatment at 105° C. for 15 hours in the air to remove remaining water. Thereafter, the temperature was elevated up to 1100° C., and the fine line was baked at 1100° C. for one hour in argon gas.

Further, the lead was heated and baked at 700° C. in an oxidative atmosphere to remove carbonized resin compounds, whereby a white baked lead having a diameter of 0.57 mm was obtained.

Next, the baked lead described above was dipped into a red dye solution comprising:

| red dye [Spilon Red C-GH (manufactured by Hodogaya Chemical Ind. Co., Ltd.) | 25% by weight |
|---|---|
| ethyl alcohol | 25% by weight |
| polyoxyethylene lauryl ether (n = 9) | 50% by weight | and left standing at room temperature for 24 hours. The lead was taken out from the solution and then dried at 80° C. for 5 hours to remove ethyl alcohol, whereby a red baked pencil lead having a diameter of 0.57 mm was obtained.

Comparative Example 1

The same baked lead (third baked lead) as in Example 1 was dipped into a red dye solution comprising:

| red dye [Spilon Red C-GH (manufactured by Hodogaya Chemical Co., Ltd.) | 25% by weight |
|---|---|
| ethyl alcohol | 15% by weight |
| polyoxyethylene oleyl ether (n = 25) | 60% by weight | and left standing at room temperature for 24 hours. The lead was taken out from the solution and then dried at 80° C. for 5 hours to remove ethyl alcohol, whereby a red baked pencil lead having a diameter of 0.57 mm was obtained.

Comparative Example 2

The same baked lead (third baked lead) as in Example 1 was dipped into a red dye solution comprising:

| red dye [Spilon Red C-GH (manufactured by Hodogaya Chemical Co., Ltd.) | 25% by weight |
|---|---|
| ethyl alcohol | 45% by weight |
| polyoxyethylene oleyl ether (n = 2) | 30% by weight | and left standing at room temperature for 24 hours. The lead was taken out from the solution and then dried at 80° C. for 5 hours to remove ethyl alcohol, whereby a red baked pencil lead having a diameter of 0.57 mm was obtained.

Comparative Example 3

The same baked lead (third baked lead) as in Example 1 was dipped into a blue dye solution comprising:

| | |
|---|---|
| blue dye [Valifast Blue 1605 (manufactured by Orient Chemical Ind. Co., Ltd.) | 15% by weight |
| isopropyl alcohol | 20% by weight |
| lauryl alcohol | 65% by weight | and left standing at room temperature for 24 hours. The lead was taken out from the solution and then dried at 90° C. for 5 hours to remove isopropyl alcohol, whereby a blue baked pencil lead having a diameter of 0.57 mm was obtained.

Comparative Example 4

The same baked lead (third baked lead) as in Example 3 was dipped into a red dye solution comprising:

| | |
|---|---|
| red dye [Spilon Red C-GH (manufactured by Hodogaya Chemical Co., Ltd.) | 25% by weight |
| ethyl alcohol | 25% by weight |
| polyoxyethylene lauryl ether (n = 25) | 50% by weight | and left standing at room temperature for 24 hours. The lead was taken out from the solution and then dried at 80° C. for 5 hours to remove ethyl alcohol, whereby a red baked pencil lead having a diameter of 0.57 mm was obtained.

The baked color pencil leads prepared in Examples 1 to 3 and Comparative Examples 1 to 4 were measured and evaluated for erasability with an eraser, intensity of the drawn lines and a condition of an NBR-made holding chuck in a mechanical pencil by the following methods.

(1) Erasability with an eraser:

The erasability with an eraser was determined according to the following equation:

Erasability with an eraser(%)=[(intensity of drawn lines)−(intensity after erasing drawn lines)]/(intensity of drawn lines)×100

(2) Intensity of drawn lines:

Measured according to JIS S 6005.

(3) Condition of NBR-made holding chuck in mechanical pencil:

The leads (lead diameter: 0.57 mm) prepared were left standing in a constant temperature bath of 60° C. for one month while keeping the leads being out by about 5 mm from the head of a mechanical pencil from which leads having a lead diameter of up to 0.59 mm could be drawn out. Thereafter, it was tested whether or not a discrete lead having a lead diameter of 0.59 mm could be drawn out from the mechanical pencil described above. It was judged that the holding chuck of the mechanical pencil from which the discrete lead could not be drawn out was swollen by the dye ink filled into the leads prepared.

The results thereof are shown in Table 1.

TABLE 1

| | Erasability with eraser (%) | Intensity of drawn line D | Condition of holding chuck |
|---|---|---|---|
| Example 1 | 96.0 | 0.25 | Drawable |
| Example 2 | 100.0 | 0.14 | Drawable |
| Example 3 | 93.1 | 0.29 | Drawable |

TABLE 1-continued

| | Erasability with eraser (%) | Intensity of drawn line D | Condition of holding chuck |
|---|---|---|---|
| Comparative Example 1 | 63.6 | 0.22 | Not drawable |
| Comparative Example 2 | 92.3 | 0.13 | Not drawable |
| Comparative Example 3 | 100.0 | 0.05 | Not drawable |
| Comparative Example 4 | 55.0 | 0.20 | Not drawable |

Comments on the results shown in Table 1:

As apparent from the results shown in Table 1, it has become clear that the baked leads prepared in Examples 1 to 3 falling in the scope of the present invention have good erasability with an eraser and sufficient intensity of the drawn lines and can be used in a conventional mechanical pencil.

In contrast with this, in Comparative Examples 1 and 4, the solubility of the dye was good but the drawn lines were hard to be erased with an eraser since polyoxyethylene alkyl ethers were solid at room temperature due to a large n number thereof, and the holding chucks in the mechanical pencils were swollen.

In Comparative Example 2, the amount of polyoxyethylene oleyl ether was small, and the amount of ethanol was large. Accordingly, the dye was able to be dissolved but was solidified after removing ethanol, so that the lead was felt hard when used to write and the intensity of the drawn lines was low.

In Comparative Example 3, lauryl alcohol was substituted for polyoxyethylene lauryl ether, and the dye was not completely dissolved. Only the dissolved part was filled into the porous baked lead, but the concentration of the dye was not sufficiently high, so that the intensity of the drawn lines was low.

What is claimed is:

1. A baked color pencil lead prepared by impregnating pores of a white or light-colored porous baked lead with a dye ink containing 37% by weight or more of polyoxyethylene alkyl ether represented by the following Formula (1):

$$R_1\text{—}O\text{—}(CH_2CH_2O)_nH \tag{1}$$

wherein $R_1$ represents a decyl, undecyl, lauryl, tridecyl or oleyl group, and n is an integer of 1 to 14.

2. A baked color pencil lead prepared by impregnating pores of a white or light-colored porous baked lead comprising a colorless or white filler and silicon nitride which is a binder using perhydropolysilazane as a starting material with a dye ink containing 37% by weight or more of polyoxyethylene alkyl ether represented by the following Formula (1):

$$R_1\text{—}O\text{—}(CH_2CH_2O)_nH \tag{1}$$

wherein $R_1$ represents a decyl, undecyl, lauryl, tridecyl or oleyl group, and n is an integer of 1 to 14.

3. A process for producing a baked color pencil lead comprising the steps of:

forming a white or light-colored porous baked lead, filling the pores of said baked lead with a dye solution prepared by dissolving a dye in a mixed solvent of at least polyoxyethylene alkyl ether represented by the following Formula (1) and a low boiling point organic solvent, wherein polyoxyethylene alkyl ether contained in the dye solution is adjusted to 35 to 90% by weight, and then drying to remove said low boiling point organic solvent:

$$R_1-O-(CH_2CH_2O)_nH \qquad (1)$$

wherein $R_1$ represents a decyl, undecyl, lauryl, tridecyl or oleyl group, and n is an integer of 1 to 14.

4. A process for producing a baked color pencil lead comprising the steps of:

filling pores of a white or light-colored porous baked lead comprising a colorless or white filler and silicon nitride which is a binder using perhydropolysilazane as a starting material with a dye solution prepared by dissolving a dye in a mixed solvent of at least polyoxyethylene alkyl ether represented by the following Formula (1) and a low boiling point organic solvent, wherein polyoxyethylene alkyl ether contained in the dye solution is adjusted to 35 to 90% by weight, and then drying to remove said low boiling point organic solvent:

$$R_1-O-(CH_2CH_2O)_nH \qquad (1)$$

wherein $R_1$ represents a decyl, undecyl, lauryl, tridecyl or oleyl group, and n is an integer of 1 to 14.

* * * * *